Aug. 20, 1963  W. T. LYONS ETAL  3,101,382
GAS AND LIQUID CONTACT APPARATUS
Filed Jan. 14, 1960
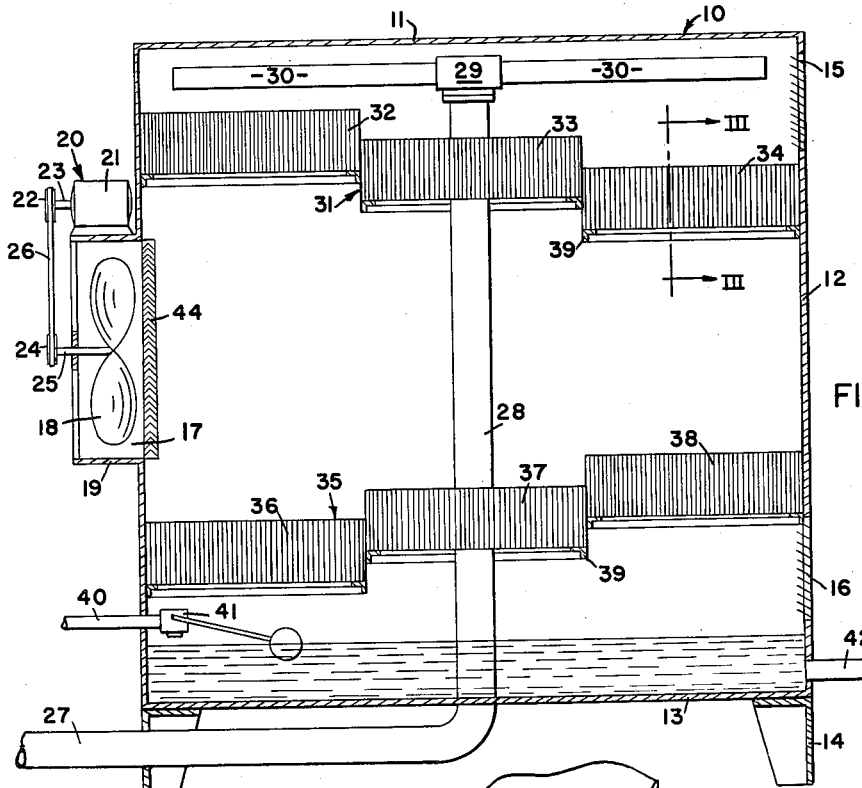
FIG. 2
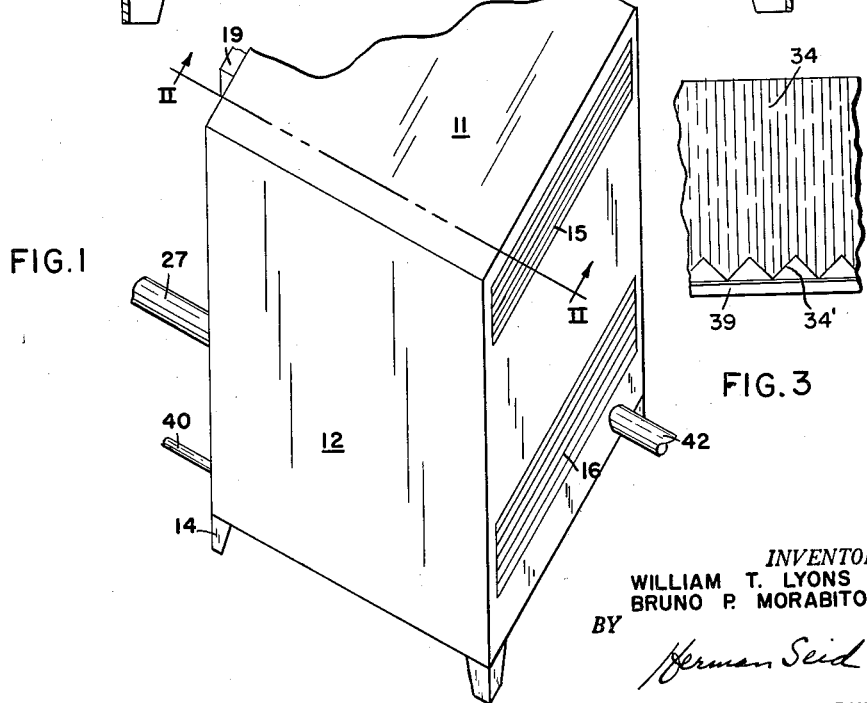
FIG. 1
FIG. 3
*INVENTOR.*
WILLIAM T. LYONS
BRUNO P. MORABITO
BY
*Herman Seid*
ATTORNEY.

United States Patent Office 3,101,382
Patented Aug. 20, 1963

3,101,382
GAS AND LIQUID CONTACT APPARATUS
William T. Lyons, Dewitt, and Bruno P. Morabito, Liverpool, N.Y., assignors to Carrier Corporation, Syracuse, N.Y., a corporation of Delaware
Filed Jan. 14, 1960, Ser. No. 2,493
2 Claims. (Cl. 261—24)

This invention relates to gas and liquid contact apparatus and more particularly to a multi-stage arrangement for such apparatus.

An important application of this invention is with refrigerating systems having water-cooled condensers. Many commercial and industrial refrigerating systems employ cooling towers to reduce water consumption by continuously recooling condenser water. The induced-draft cooling tower which is used extensively today, comprises an enclosed box-like structure having openings therein and a fan for drawing air through the tower. Intermediate the top and bottom of the tower is a packing or fill which retards the fall of the water supplied over the top of the packing and permits the water particles to come into intimate contact with the moving air. The packing which may be of the type described in Munters Patent 2,809,818, issued October 15, 1957, is composed of a series of thin partition walls arranged to form a plurality of adjacent passageways open at the top and bottom, the passageways having so small cross-sectional areas that water can bridge the sides of the passageway by surface tension. The bottom edge of the packing may be serrated to break the bridging of the liquid. A small proportion of the water evaporates and the resultant vapor carries away the latent heat of vaporization. The loss of this heat causes a reduction in the temperature of the water. The packing offers considerable resistance to the air flowing therethrough necessitating the use of a large and costly fan drive.

As cooling towers are often placed on roof tops of modern manufacturing facilities and on the top of high buildings, it is imperative that the tower be light weight, compact in size, and of as high a capacity as possible for a predetermined size.

A primary object of this invention is to provide a novel and improved type of multi-stage gas and liquid contact apparatus.

Another object of this invention is to provide a novel two stage gas and liquid contact apparatus having greater capacity than a single stage gas and liquid contact apparatus of comparable size with no increase in air resistance.

Still another object of this invention is to provide a gas and liquid contact apparatus that uses a smaller fan drive than conventional apparatus of equal capacity.

A further object of this invention is to provide an extremely light weight and compact gas and liquid contact apparatus.

The specific structural details of a preferred embodiment of the invention will be made most manifest in full, clear and exact terms in conjunction with the accompanying drawing wherein:

FIGURE 1 is a perspective view of a multi-stage cooling tower constructed in accordance with the principles of our invention.

FIGURE 2 is an elevational view, partly in section, of a multi-stage cooling tower taken generally along the line II—II of FIGURE 1; and FIGURE 3 is a view in cross-section illustrating a packing provided with means for breaking a liquid bridge.

Referring to the drawings in detail, there is shown a cooling tower which is in the form of a polygonal casing 10. The top 11 and side walls 12 of the casing may be made of light weight metal. A sump or reservoir for collecting water is formed by bottom 13. Legs 14 support the casing. If desired, a cylindrical casing can be used.

Air inlet means comprising upper and lower louvered openings 15 and 16, respectively, are formed in one of the side walls. An air outlet or opening 17 is formed in the opposite side wall. It is contemplated that an opening may be provided in the top to eliminate the upper louvered opening and thus reduce the height of the casing. An alternate arrangement would be to provide upper and lower louvered openings in each of the side walls adjacent the side wall having the discharge opening therein.

Fan 18 is mounted exteriorly of casing 10 in housing 19 which is detachably secured to side wall 12. The means for driving fan 18 may comprise electric motor 21 and belt and pulley drive means. Drive pulley 22 is connected to motor shaft 23 and driven pulley 24 is connected to fan shaft 25. Power is transmitted from pulley 22 to pulley 24 by fan belt 26. Air is drawn into the casing through the louvered openings 15 and 16 and is discharged through housing 19 by fan 18. If desired, the direction of rotation of fan 18 may be reversed to produce a forced draft arrangement.

The packing in the casing includes an upper cooling stage 31 and a lower cooling stage 35. The upper cooling stage may be comprised of three tiers 32, 33, and 34 of fill material, preferably alternate corrugated and plain sheets attached at their points of contact to provide a plurality of adjacent parallel cells between the flat and undulating folds of the sheets. The cross-sectional areas of the cells are so small that liquid can bridge the walls of the cells by surface tension. Means, such as a serrated bottom 34', FIGURE 3, are provided to break the bridging of the liquid. As shown, for example, in the above noted Munters patent, the bottom edge of the packing may be serrated. The sheets may be made of chemically treated, plastic fortified cellulose possessing qualities of high moisture absorbency and a large degree of wet strength. Each tier is supported by angle members 39 suitably affixed to the casing. Lower cooling stage 35 is similarly comprised of three tiers 36, 37 and 38. It is to be noted that the tiers are staggered, preferably, with the tiers adjacent the discharge opening 17 being spaced farther apart than the tiers adjacent the openings 15 and 16. The packing is arranged in a generally V-shaped configuration to accommodate the increased volume of air at the outlet and to maintain a substantially constant air velocity within the casing.

The liquid to be cooled flows through line 27 to supply or riser pipe 28, and then to rotary distribution means in the form of header 29. The arms 30 of the header have openings along their length from which water is discharged onto the top surface of the packing.

The usual make-up water line 40 and make-up control float valve 41 are provided to add sufficient water to the sump to compensate for the small amount lost due to evaporation and drift. Water is collected in the sump or bottom 13 and is fed from the sump to the point of use by means of line 42.

A series of eliminator plates 44 are provided adjacent fan 18 to remove particles of liquid held in suspension in the air before they leave the cooling tower.

When the cooling tower is in operation, water to be cooled is uniformly discharged over the upper cooling stage 31 of the packing by rotary header 29. The water flows by gravity through upper cooling stage 31 in parallel flow relationship with the air stream drawn into the casing through opening 15. Then the water drains through lower cooling stage 35 in counterflow relationship with the air stream drawn into the casing through opening 16 and is collected in the bottom 13.

The air resistance through the novel two stage packing arrangement is substantially less by comparison with a unitary packing of the combined packing height. A smaller and less costly fan drive can be employed to supply the desired volume of air.

By virtue of the unique staging of the packing, there is more mass transfer and the temperature of the water to be cooled can be reduced more for given quantities of air, water, and packing surface.

The novel two stage cooling tower has increased capacity for the same floor space with no attendant increase in air resistance resulting in a reduced cost per ton of rated capacity, and further is extremely light weight and compact in size.

While we have described and illustrated a preferred embodiment of our invention, it will be understood that our invention is not limited thereto since it may be otherwise embodied within the scope of the following claims.

We claim:

1. In a multi-stage cooling tower, the combination of a casing having an upper air inlet, a lower air inlet, and an air outlet respectively spaced therein, a packing in said casing having a first cooling stage comprising a plurality of staggered tiers positioned below said upper inlet and a second cooling stage vertically spaced from the first cooling stage comprising a plurality of staggered tiers positioned above said lower inlet, said first stage overlying said second stage, the stages forming a generally V-shaped configuration opening toward the air outlet, tiers adjacent the air outlet being spaced farther apart than tiers adjacent the inlets, means for providing movement of air into said inlets, through said tiers and out of said outlet, said outlet being placed in the casing between said stages, means for supplying liquid onto said first cooling stage, the bottom surface of each tier of the first cooling stage being generally horizontally disposed so that liquid passing through the first cooling stage is uniformly discharged from the bottom surface of each tier, and means below said second cooling stage for collecting liquid, said packing having vertical passages therein so constructed that liquid flows through the first cooling stage in parallel flow relationship with the air passing therethrough, drains onto the top of the second cooling stage and flows through the second cooling stage in counterflow relationship with the air passing therethrough.

2. A multi-stage cooling tower according to claim 1 in which each tier comprises thin partition walls arranged to provide a series of adjacent parallel vertically disposed cells open at the top and bottom to form passages therethrough, the cross-sectional areas of said cells being so small that liquid can bridge the walls of the cells by surface tension, and means for breaking the bridging of the liquid.

References Cited in the file of this patent

UNITED STATES PATENTS

| 2,054,809 | Fleisher | Sept. 22, 1936 |
| 2,322,110 | Bock | June 15, 1943 |
| 2,512,271 | Green | June 20, 1950 |
| 2,809,818 | Munters | Oct. 15, 1957 |
| 2,906,512 | Meek | Sept. 29, 1959 |